United States Patent
Albot et al.

(10) Patent No.: US 8,117,607 B2
(45) Date of Patent: Feb. 14, 2012

(54) ADMINISTRATION OF KERNEL EXTENSIONS

(75) Inventors: Andre L. Albot, Austin, TX (US); Robert George Kovacs, Austin, TX (US); Michael Edward Lyons, Round Rock, TX (US); James A. Pafumi, Leander, TX (US); Wojciech Stryjewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1698 days.

(21) Appl. No.: 10/920,904

(22) Filed: Aug. 18, 2004

(65) Prior Publication Data

US 2006/0041878 A1 Feb. 23, 2006

(51) Int. Cl.
*G06F 9/44* (2006.01)
(52) U.S. Cl. .......................... 717/162; 719/331
(58) Field of Classification Search ......... 710/1; 717/107, 717/163–165, 174
See application file for complete search history.

(56) References Cited

U.S. PATENT DOCUMENTS

| | | | | |
|---|---|---|---|---|
| 5,634,058 A * | 5/1997 | Allen et al. | .................... | 717/163 |
| 5,708,811 A * | 1/1998 | Arendt et al. | ................. | 717/163 |
| 6,075,939 A * | 6/2000 | Bunnell et al. | ................ | 717/107 |
| 6,314,566 B1 * | 11/2001 | Arrouye et al. | ............... | 717/148 |
| 6,349,408 B1 * | 2/2002 | Smith | ........................... | 717/174 |
| 6,763,397 B1 * | 7/2004 | Bracha et al. | ................. | 719/332 |
| 7,082,555 B2 * | 7/2006 | Toyooka et al. | ................ | 714/48 |
| 7,171,550 B1 * | 1/2007 | Gryck et al. | .................. | 713/100 |
| 2003/0074487 A1 * | 4/2003 | Akgul et al. | .................. | 709/328 |
| 2004/0010632 A1 * | 1/2004 | Kiick | ................................ | 710/1 |

OTHER PUBLICATIONS

Avi Silberschatz, Peter Galvin, and Greg Gagne, "Operating System Concepts", Jun. 15, 2001, John Wiley & Sons, Sixth Edition, pp. 703-707, 752-754.*
Jean BAcon, Tim Harris, "Operating Systems: Concurrent and Distributed Software Design", Mar. 11, 2003, Addison-Wesley, section 27.3.*
Mealey, et al.; Method for Abstracting Machine Dependent Operating System Code; Feb. 1995; pp. 105-106; TDB vol. 38, n2; US.

* cited by examiner

*Primary Examiner* — Lewis Bullock, Jr.
*Assistant Examiner* — Jue Wang
(74) *Attorney, Agent, or Firm* — DeLizio Gilliam, PLLC

(57) ABSTRACT

Methods, systems, and products are disclosed for implementing a generic kernel extension framework that operate generally to allow one kernel extension to register a function callable by other kernel extensions. A kernel extension can be loaded even if a function it potentially could need is not available. If in fact the running kernel extension does eventually request a function that no other kernel extension has registered to provide, it is failed gracefully with a return error code. The client kernel extension can still function normally, assuming the desired service is non-critical. Example services in the non-critical category may include, for example, advanced error handling functions, statistical functions, reporting functions, and so on, including many others as will occur to those of skill in the art.

20 Claims, 5 Drawing Sheets

| Function Registration Table ~ 202 ||||||  |
|---|---|---|---|---|---|---|
| Function Pointer 204 | Key 206 | Handle 208 | Grant Count 210 | Unregister Flag 212 | Interrupt Flag 214 | |
| 1EF6 | 123 | --- | 0 | FALSE | --- | ←216 |
| 2DE4 | 234 | 100 | 2 | FALSE | --- | ←218 |
| E4B7 | 345 | 200 | 1 | TRUE | --- | ←220 |

FIG. 3

ADMINISTRATION OF KERNEL EXTENSIONS

BACKGROUND OF THE INVENTION

1. Field of the Invention

The field of the invention is data processing, or, more specifically, methods, systems, and products for administration of kernel extensions.

2. Description of Related Art

Modern operating systems, particularly various versions of Unix, typically include the capability to extend a base kernel through dynamically loadable and unloadable modules called 'kernel extensions.' These kernel extensions make use of kernel services, and in turn can provide services themselves.

Use of kernel extensions is complicated, however, when one kernel extension uses a service made available through another kernel extension. Kernel extensions publish namespaces identifying calling dependencies. A kernel loader may not load a kernel extension if it uses a function provided by another kernel extension if the other kernel extension is not loaded and not available to load immediately.

In addition, circular dependencies may prevent both kernel extension from loading, as when a first kernel extension will not load because it uses a function from a second extension that in turn will not load because it uses a function from the first kernel extension—which itself is not yet loaded. For all these reasons, there is an ongoing need or improvement in the administration of kernel extensions.

SUMMARY OF THE INVENTION

Methods, systems, and products are disclosed for implementing a generic kernel extension framework that operate generally to allow one kernel extension to register a function callable by other kernel extensions. A kernel extension can be loaded even if a function it potentially could need is not available. If in fact the running kernel extension does eventually request a function that no other kernel extension has registered to provide, it is failed gracefully with a return error code. The client kernel extension can still function normally, assuming the desired service is non-critical. Example services in the non-critical category may include, for example, advanced error handling functions, statistical functions, reporting functions, and so on, including many others as will occur to those of skill in the art.

By breaking the loader dependency between the kernel extensions, the framework facilitates facilitate the unloading and reloading of the server kernel extension with no need to wait to unload because client kernel extension is still loaded. In addition, the framework is implemented to that functions provided by server kernel extensions operate in manner that is transparent to the kernel. The registered functions can be whatever the cooperating kernel extensions define them to be and are easily extensible.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 sets forth a diagram of an exemplary data structure useful for administration of kernel extensions.

DETAILED DESCRIPTION OF EXEMPLARY EMBODIMENTS

Introduction

The present invention is described to a large extent in this specification in terms of methods for administration of kernel extensions. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Administration of Kernel Extensions

Figure 1:
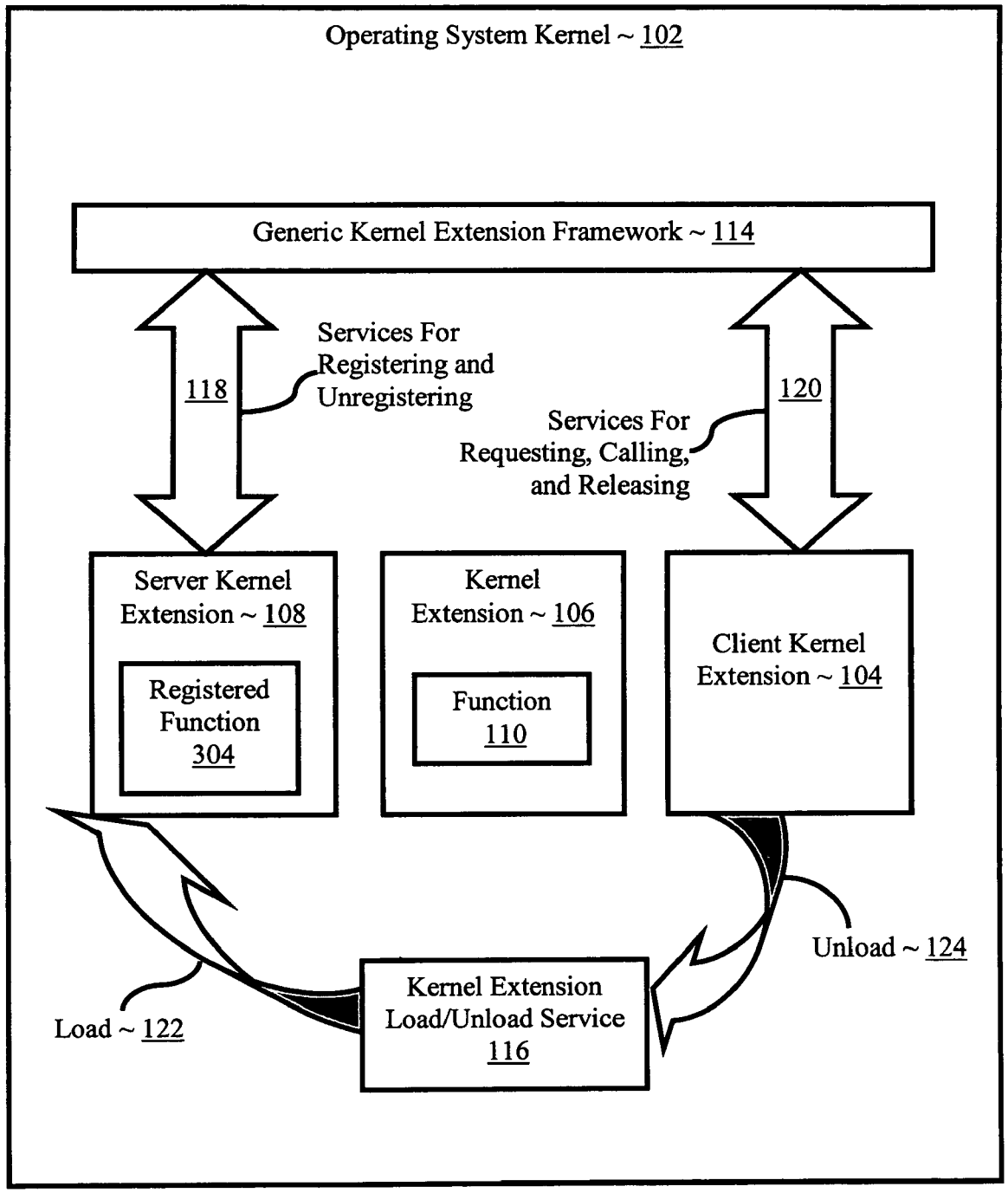
FIG. 1 sets forth a block diagram of an exemplary system for administration of kernel extensions.

Exemplary methods, systems, and products for administration of kernel extensions according to embodiments of the present invention are described with reference to the accompanying drawings, beginning with FIG. 1. FIG. 1 sets forth a block diagram of an exemplary system for administration of kernel extensions according to embodiments of the present invention. The system of FIG. 1 includes a generic kernel extension framework ('framework') (114) implemented as a software module that provides services in an operating system kernel (102). The framework (114) provides services (118) to server kernel extensions (108) for registering and unregistering functions provided by server kernel extensions. In addition, framework (114) provides services (120) to client kernel extensions (104) for requesting, calling, and releasing functions provided by server kernel extensions.

In this specification, a 'server kernel extension' is any kernel extension that makes functions available to client kernel extensions by registering such functions with a generic kernel extension framework according to embodiments of the present invention. A 'client kernel extension' is any kernel extension that requests access to such functions registered with a generic kernel extension framework.

Whether a kernel extension is a server kernel extension or a client server extension is a matter or function. A kernel extension that provides functions through a framework for use by other kernel extensions is functioning as a server kernel extension. A kernel extension that uses functions so provided is functioning as a client server extension. One kernel extension can do both, providing functions for use by client kernel extensions and using functions provided by server kernel extension, thereby functioning at one time as a server kernel extension and at another time as a client kernel extension. In the system of FIG. 1, for example, kernel extension (106) may register its function (110) with framework (114), thereby functioning as a server kernel extension, and later may request access through the framework to registered function (304), thereby functioning as a client kernel extension.

The system of FIG. 1 also includes as part of kernel (102) a service (116) for loading and unloading kernel extensions. Service (116) is programmed according to embodiments of the present invention to load (122) and unload (124) kernel extensions (104, 106, 108) without regard to calling dependencies among them. That is, each kernel extension to be loaded or unloaded specifies its own calling dependencies, which functions it calls in other kernel extensions, and service (116) loads client kernel extensions even when server kernel extensions providing functions to be called by the loading client kernel extension are unavailable, not yet loaded and perhaps never to be loaded. Similarly, service (116) unloads server kernel extensions even when client kernel extensions that call functions in the unloading server kernel extensions are still loaded and still capable of calling the now unavailable, unloaded functions. By implementing service (116) kernel extensions are loaded that would not have been loaded by a traditional loader, and kernel extensions are unloaded that would not have been unloaded by a traditional unload service.

Systems for administration of kernel extensions according to embodiments of the present invention typically are implemented as automated computing machinery, that is, as computers. For further explanation, FIG. 2 sets forth a block diagram of an exemplary computer useful as a system for administration of kernel extensions according to embodiments of the present invention.

Figure 2:
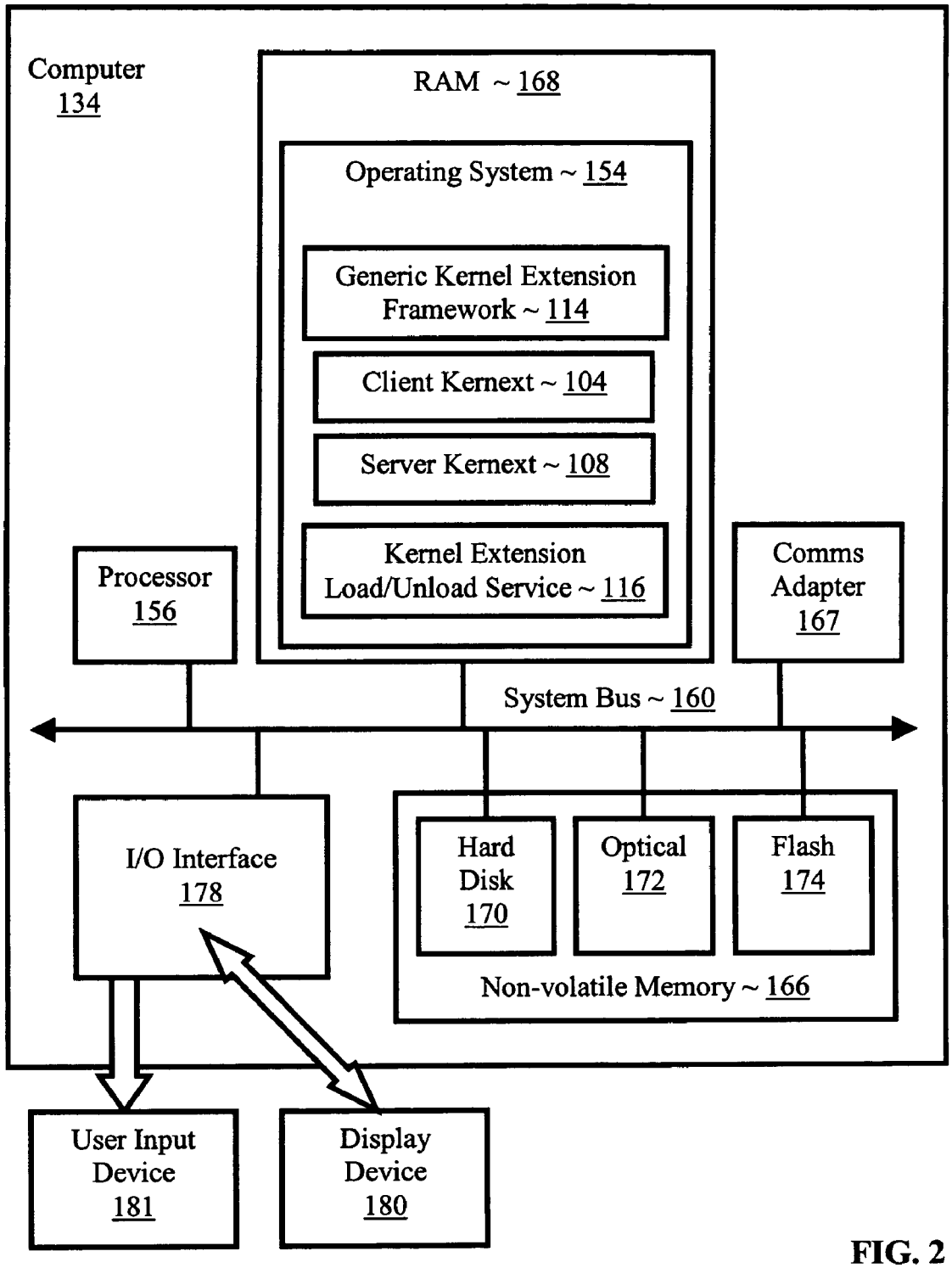
FIG. 2 sets forth a block diagram of an exemplary computer useful as a system for administration of kernel extensions.

The computer (134) of FIG. 2 includes a computer processor (156). Although only one is shown, in fact, such computer systems may include any number of processors. Moreover, the type of processor also is not a limitation of the present invention. Some processors may support execution of only one thread at a time. Other processors may support hardware multi-threading or 'simultaneous multi-threading' ('SMT'), hardware support for multiple independent threads on a processor at the same time, multiple registers sets for threads instead of just one, allowing multiple threads to issue multiple instructions during each cycle of a processor's execution. The use of any kind of processor as will occur to those of skill in the art is well within the scope of the present invention.

The computer of FIG. 2 includes random access memory ('RAM') (168) that contains an operating system (154) that in turn includes a generic kernel extension framework (114), a client kernel extension (104), a server kernel extension (108), and a service (116) for loading and unloading kernel extensions. Examples of operating systems that support kernel extensions and that therefore are adaptable for use in administration of kernel extensions according to embodiments of the present invention include Hewlett Packard's HP-UX™, IBM's AIX™, Sun's Solaris™, and others as will occur to those of skill in the art.

The computer of FIG. 2 includes non-volatile computer memory (166) coupled through a system bus (160) to processor (156) and to other components of the computer. Non-volatile memory (166) may be implemented as a hard disk drive (170), optical disk drive (172), electrically erasable programmable read-only memory space (so-called 'EEPROM' or 'Flash' memory) (174), RAM drives (not shown), or as any other kind of non-volatile computer memory as will occur to those of skill in the art.

The example computer system (134) of FIG. 2 includes a communications adapter (167) implementing connections for data communications with other computers, clients, servers, or networks. Communications adapters implement the hardware level of connections for data communications between computers directly with one another and through networks. Examples of communications adapters include modems for wired dial-up connections, Ethernet (IEEE 802.3) adapters for wired LAN connections, and 802.11b adapters for wireless LAN connections.

The example computer system of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181), such as keyboards and mice.

For further explanation, FIG. 3 sets forth a diagram of an exemplary data structure useful for administration of kernel extensions according to embodiments of the present invention. The data structure of FIG. 3 is shown as a table (202), each record of which represents a registration of a function made available by a server kernel extension for use by client kernel extensions.

Each record of the table in FIG. 3 includes a field for a function pointer (204) that identifies a calling address of a registered function. Each record of the table in FIG. 3 includes a field for a key (206) that uniquely identifies a registered function within the framework. Each record of the table in FIG. 3 includes a field for a handle (208), also unique within the framework, whose value is provided to client kernel extensions to represent a grant of access to a registered function. Each record of the table in FIG. 3 includes a field for a grant count (210) that is used to control unregistration of registered functions. Each record of the table in FIG. 3 includes a field for an unregister flag (212) which when set to TRUE represents a request to unregister a registered function. Each record of the table in FIG. 3 includes a field for an interrupt flag (214) which when set to TRUE prohibits calls to a registered function with interrupts disabled.

The example of FIG. 3 includes three example records (216, 218, 220) representing functions registered in a generic kernel extension framework. As a practical matter, of course, many more than three functions may be registered through a framework, but the three functions represented here are only examples for explanation.

Record (216) represents a registered function with no handle and a grant count of zero. The empty handle means that this record (216) represents a registered function access to which has not yet been requested by any client kernel extension, which is consistent with a grant count of zero.

Record (218) represents a registered function with a handle value of 100 and a grant count of 2. The presence of a handle value and the grant count of 2 mean that this record (218) represents a registered function access to which has been requested at least twice by one or more client kernel extensions and that two handles representing grants of access are still in the possession of two client kernel extensions. Whether access has been requested to this function more than twice is ambiguous. Possibly it has been requested ten times and released eight times. But two grants of access are still outstanding.

Record (220) represents a registered function with a handle value of 200, a grant count of 1, and an unregister flag set TRUE. The presence of a handle value and the grant count of 1 mean that this record (220) represents a registered function access to which has been requested at least once by at least one client kernel extension and that one handle representing a grant of access is still in the possession of one client kernel extension. That unregister flag set TRUE means that the framework has received a request to unregister the registered function represented by record (220) but has not yet unregistered the function. The function was not unregistered because, when the unregister request was received, the grant count was higher than zero, indicating that at least one grant of access to the function was as yet unreleased—still in use by at least one client kernel extension. In the presence of a TRUE unregister flag, the framework will grant no more requests for access to this function, and if and when the last handle is released and the grant count goes to zero, the function represented by record (220) will then be unregistered. Record (220) will then be deleted from the table to implement the unregistration.

Figure 4:
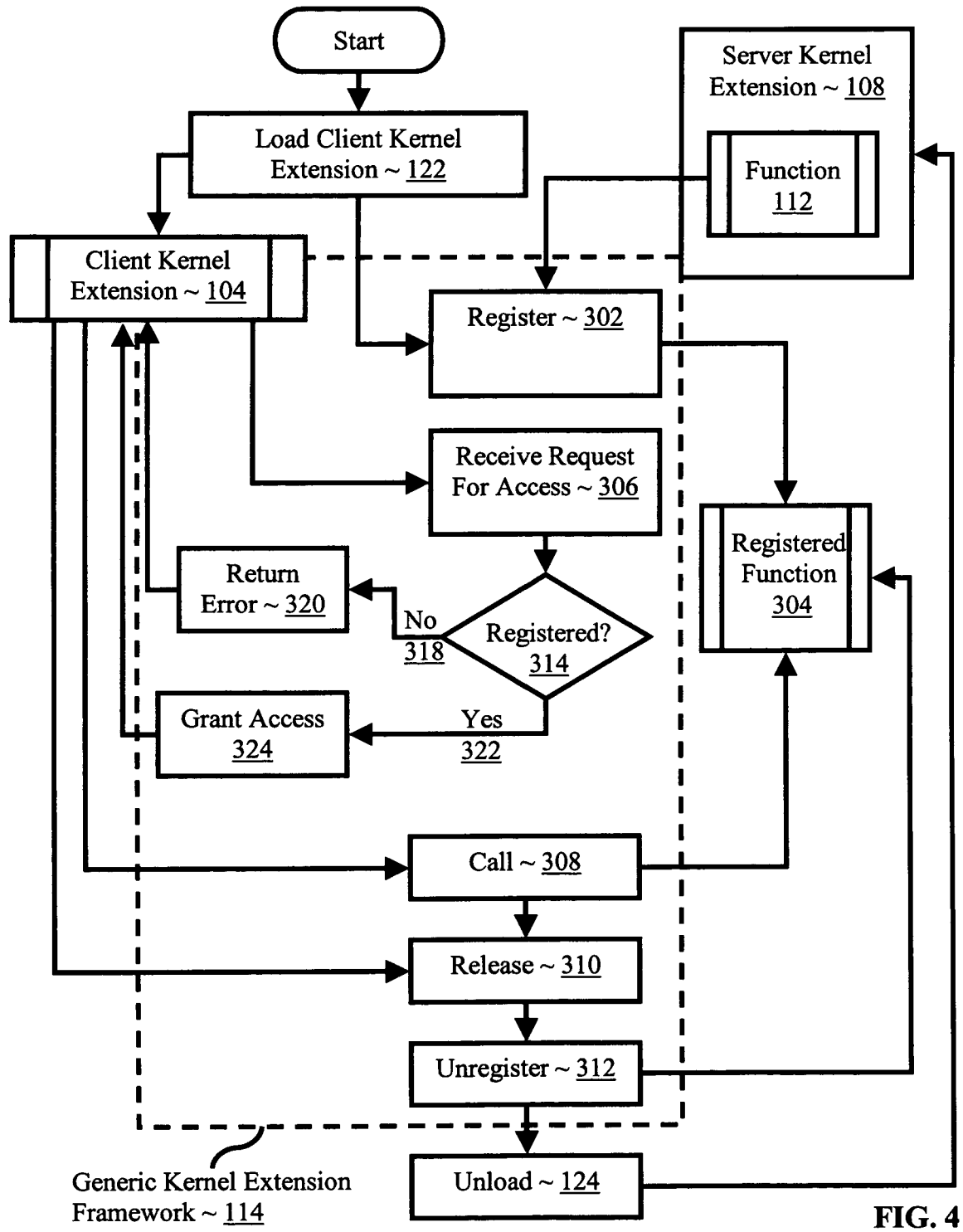
FIG. 4 sets forth a flow chart illustrating an exemplary method for administration of kernel extensions.

For further explanation, FIG. 4 sets forth a flow chart illustrating an exemplary method for administration of kernel extensions that includes loading (122) into a kernel a client kernel extension (104) that uses functions provided by server kernel extensions. In the example of FIG. 4, one or more of the functions provided by the server kernel extensions and used by the client kernel extension optionally is unavailable. That is, the loading process (122) loads the client kernel extension regardless whether is uses functions from server kernel extensions that are not yet loaded.

The method of FIG. 4 also includes registering (302), in a generic kernel extension framework (114), a function (112) provided by a server kernel extension (108). In the method of FIG. 4, registering (302) a function provided by a server kernel extension typically includes providing a key that identifies the registered function. Registering (302) a function in this way may be carried out by a service specified according to the following prototype:

```
long framework_register
(
    long key,
    boolean interrupt_flag,
    long (*funcPtr)(void*) /* function pointer */
);
```

This prototype specifies a service of a generic kernel extension framework named 'framework_register' that registers a function with the kernel, that is, with the framework in the kernel, which function can then be called by other kernel extensions, that is, by client kernel extensions. The function is identified to the kernel (and potential users) by a key implemented as a long integer and named 'key.' This key is used by client kernel extensions to request access to a registered function.

In the framework_register service, a flag, a Boolean field named 'flag,' specifies whether the registered function can be called with interrupts disabled. Exclusions of calls to functions for which the interrupt flag is set are enforced by the call routine, framework_call, as described below.

The pointer named 'funcPtr' is a pointer to the function to be registered by a call to framework_register. The service framework_register may register the function so identified by creating a record representing the registration of the function in a table having a structure like that exemplified in FIG. 3 and storing in the record so created the value of the key (206 on FIG. 3) and the value of the function pointer (204 on FIG. 3).

The method of FIG. 4 also includes receiving (306) in the framework (114) from the client server kernel extension (104) a request for access to the registered function (304). In the method of FIG. 4, receiving (306) a request for access to the registered function typically also includes receiving a key that identifies the registered function and granting access to the registered function in dependence upon the key. That is, a calling client kernel extension must provide a key that validly identifies a registered function in order for a request for access to be granted. Granting access then typically is carried out by returning a valid handle to the calling client kernel extension. The handle effectively represents a grant of access. When the client kernel extension calls the registered function, the client kernel extension provides the handle to the framework to identify the registered function.

The method of FIG. 4 includes determining (314) whether the function identified by a key is in fact registered in the framework (114) by, for example, searching for the key in a table similar to the one shown in FIG. 3. If the key is found, the method of FIG. 4 grants access (324) by returning a handle. If the key is not found, that is, if a key is received for an unregistered function, the method of FIG. 4 returns (320) an error code that notifies the client kernel extension (104) that the function is unregistered.

Receiving (306) in the framework from a client server kernel extension a request for access to a registered function (304) in this way may be carried out by a service specified according to the following prototype:

```
long framework_request
(
    long key,
    long *handle /* pointer to function handle */
);
```

This prototype specifies a service of a generic kernel extension framework named 'framework_request' that represents a request for access to a registered function identified by the value of 'key.' This service will not grant access to function for which unregistration has been requested. This service therefore checks whether the function identified by the key has been marked for unregistration by, for example, reading the value of a field such as the one identified at reference (212) on FIG. 3. If the function has been marked for unregistration, this service returns an error value so signifying. If the function has not been marked for unregistration, this service confirms that the function identified by the key exists by looking it up in a table such as the one exemplified in FIG. 3.

If this is the first request for access to the function, the framework_request service creates and records a handle for the function (208 on FIG. 3), and returns the handle by storing it in the address indicated by the long pointer named 'handle.' If this is a subsequent request for access to the function, that is, the handle already exists, the framework_request service checks its unregister flag (212 on FIG. 3). If the unregister flag is set to TRUE, then its server kernel extension has requested unregistration of the function identified by the handle and framework_request will not grant access to the function, instead returning an error code. (Other client kernel extensions still in possession of the handle as previously issued to them can continue to call the function until all grants of access represented by such handles have been released through calls to framework_release, but new grants of access, new returns of the handle, are not granted when unregistration has been requested.) If the handle already exists and the function has not been marked for unregistration, the framework_request service reads the handle (208 on FIG. 3) from the record representing the registered function as identified by the key and returns it through the buffer identified by the 'handle' pointer. When this service grants a request for access to a function by returning a handle to the function, this service increments a grant count for the function such as the one illustrated at reference (210) on FIG. 3.

The method of FIG. 4 also includes calling (308) the registered function (304) through the framework. Calling (308) the registered function (304) through the framework may be carried out by a service specified according to the following prototype:

```
Long framework_call
(
    long handle, /* obtained from framework_request */
    void *funcArgs, /* buffer for function argumentss */
    long *returnValues /* buffer for return values */
);
```

This prototype specifies a service of a generic kernel extension framework named 'framework_call.' The service specified by this prototype calls the server kernel extension function identified by 'handle.' The value of handle was acquired by a client server extension through a previous call to framework_request and represents a grant of access by the framework to the function identified by the handle. Arguments for the function call are stored in a buffer identified as 'funcArgs.' Return values are proved in a buffer identified as 'returnValues.' The formats of the argument buffer and the return buffer are defined by the server kernel extension function, and they are not known to the kernel or to the framework.

Framework_call operates by finding a function registration record with a matching handle in a table like the one shown in FIG. 3, and calling the server kernel extension function whose address is in the function pointer field (204 on FIG. 3) in that record.

In addition, framework_call enforces interrupt mask exclusions according to a flag (214 on FIG. 3) set by the server kernel extension in registering the target function, that is, when the function registration record was created. If the flag is set to FALSE, framework_call will not permit execution of a call to the function if interrupts are disabled, instead returning an error code. If the flag is set TRUE, framework_call will permit execution of a call to the function whether interrupts are enabled or disabled. This advantageously allows registered functions that need run without interruption to do so.

The server kernel extension function called by framework_call obtains its call parameter values from 'funcArgs' and places its return codes in 'returnValues.' It is useful for a client kernel service that calls framework_call to distinguish return codes from framework_call and return codes from the server kernel extension function. A successful return from framework_call only means only that its call to the server kernel extension function succeeded. Return codes indicating success, failure, and return values from the server kernel extension function are in the returnValues buffer. The method of FIG. 4 includes releasing (310) access to the registered function. Releasing (310) access to the registered function may be carried out by a service specified according to the following prototype:

```
long framework_release
(
    long handle /* from framework_request */
);
```

This prototype specifies a service of a generic kernel extension framework named 'framework_release' that releases access to a registered function identified by the handle. The handle was obtained by a client kernel extension from a previous call to framework_request. The framework_release service decrements a grant count (210 on FIG. 3) for the function identified by the handle so that when all grants of access to a given function have been released, the service can be unregistered. The fact that all grants of access have been released is represented by a grant count of zero.

The method of FIG. 4 includes unregistering (312) the registered function. Unregistering (312) the registered function may be carried out by a service specified according to the following prototype:

```
long framework_unregister
(
    long key, /* key Value */
    int timeout /* Timeout in seconds */
);
```

This prototype specifies a service of a generic kernel extension framework named 'framework_unregister' that unregisters a server kernel extension function that was previously registered in the framework by, for example, deleting from a table like the one shown in FIG. 3 a record representing the registration of the function. The function to be unregistered is identified by the value of 'key,' the value established when the function was registered. If client kernel extensions are currently using the registered function, that is, one or more client kernel extensions continue in possession of an unreleased handle representing a grant of access to the function, a fact which is represented by a grant count (210 on FIG. 3) greater than zero, the framework_unregister service sets the Unregister flag to TRUE but does not presently unregister the function. In such a case, the function is eventually unregistered when the last such client kernel extension releases it grant of access by calling framework_release, thereby reducing the grant count to zero. When a registered function is successfully unregistered, the function is no longer available to client kernel extensions.

The 'timeout' parameter allows calling server kernel extensions to specify the behavior of the framework_unregister service when the function to be unregistered is still in use, that is, has a grant count greater than zero. Values of 'timeout' may, for example, specify:
  that framework_unregister is to set the unregister flag on the function registration record and then return immediately with an error code if the function is still in use, that is, has a grant count greater than zero.
  that framework_unregister is to wait for the last client kernel extension to release access to the function, that is, call framework_release and reduce the grant count to zero, before returning.

a maximum number of seconds to wait for the grant count to go to zero. In this case, a return code from framework_unregister may indicate whether the function was presently released or remains available to some client kernel extension after the timeout expires because the grant count is still greater than zero.

The method of FIG. 4 also includes unloading (124) a server kernel extension that provides through the framework a function (204) used by a client kernel extension (104) that is loaded in the kernel. That is, the unloading process (124) unloads a server kernel extension regardless whether the server kernel extension provides a function used by a client kernel extension that is still loaded, a client kernel extension that may request a function of the unloaded server kernel extension after the server kernel extension is unloaded.

Figure 5:
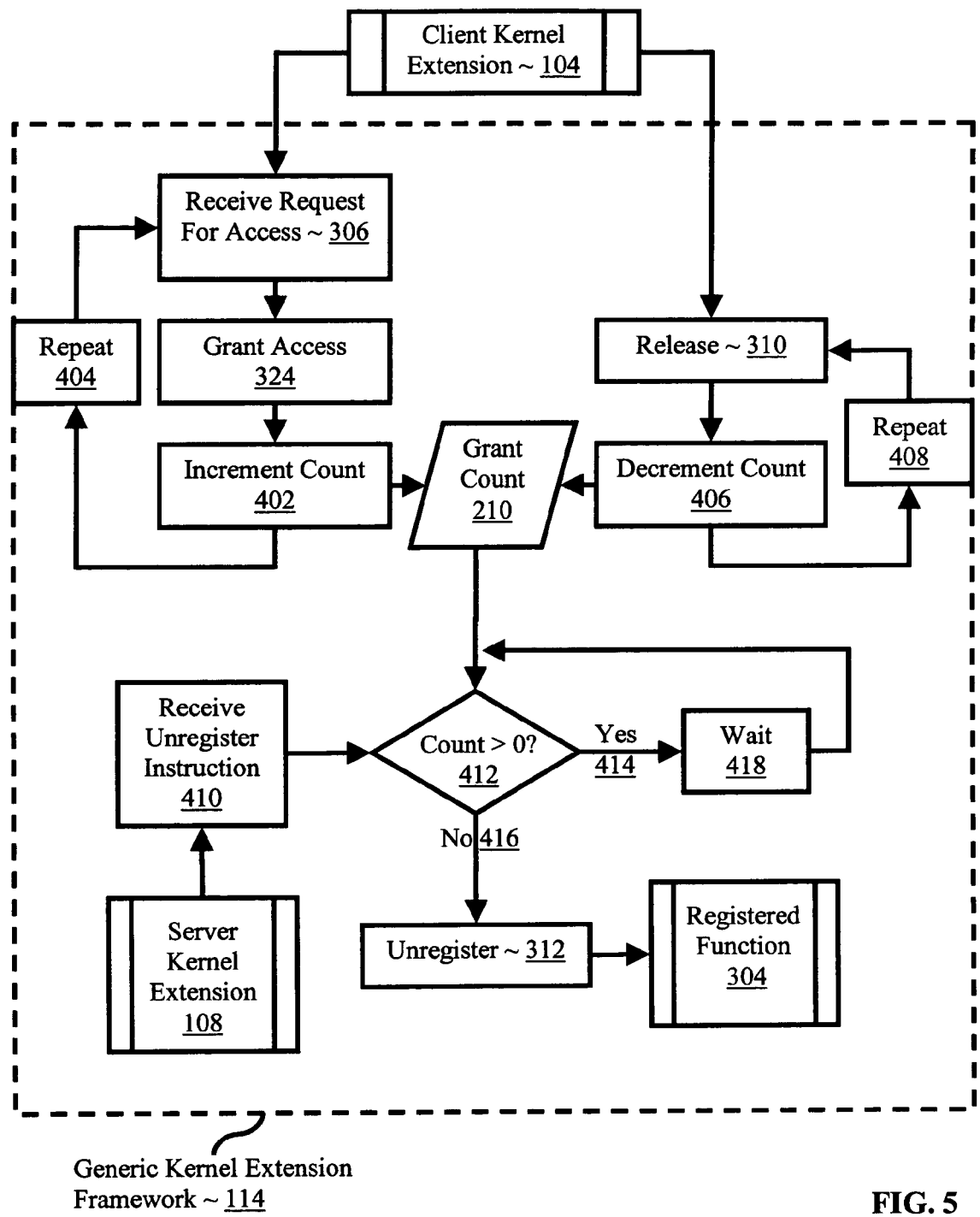
FIG. 5 sets forth a flow chart illustrating a further exemplary method of administration of kernel extensions.

For further explanation of the process of unregistering registered functions, FIG. 5 sets forth a flow chart illustrating a further exemplary method of administration of kernel extensions that includes receiving (306) in a generic kernel extension framework (114) from at least one client server kernel extension (104) a plurality of requests for access to the registered function (304). The method of FIG. 5 includes granting (324) one or more of the multiplicity of requests for access to the registered function, and the multiplicity of requests for access and grants of access are represented in a loop implemented with a repeat function (404) in which each pass through the loop includes incrementing (402) a grant count (210) of granted requests for access to the target registered function (304).

The method of FIG. 5 includes releasing (310) one or more of the granted multiplicity of requests for access to the registered function. The release service (310) in the example of FIG. 5 operates asynchronously with respect to the corresponding process for receiving and granting requests for access. That the release service (310) operates to release one or more of the granted multiplicity of requests is represented in the example of FIG. 5 by a loop implemented by a repeat function (408) that includes decrementing (406) the grant count each time a grant of access is released.

The method of FIG. 5 includes unregistering (312) the registered function only if all grants of access to the registered function are released. That is, the method of FIG. 5 includes receiving (410) from a server kernel extension (108) a request to unregister registered function (304). In the framework service prototypes described above, such a request to unregister a function is implemented by a call to framework_unregister. After receiving the request to Unregister, the method of FIG. 5 includes determining (412) whether the grant count is greater than zero. If the grant count is greater than zero (414), meaning that at least one client kernel extension is still using the target registered function, the method of FIG. 5 includes waiting (418) for the grant count to decrease to zero. When the grant count is zero (416), the method of FIG. 5 continues by unregistering (312) the registered function (304). Unregistering the registered function may be implemented, for example, deleting, from a table like the one shown in FIG. 3, a record representing the registration of the function. After a registered function is unregistered, it is no long available for use by any client kernel extension.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
loading, into a kernel of an operating system of a computer and without determining whether its calling dependencies will be loaded, a client kernel extension that is configured to access a function that provides a non-critical service, the function provided by a server kernel extension, wherein the function provided by a server kernel extension is not loaded into the kernel at the time of loading of the client kernel extension, and wherein the client kernel extension is loaded and executed even if the function provided by the server kernel extension is never to be loaded;
running the client kernel extension in the kernel of the operating system of the computer prior to the function that provides a non-critical service provided by the server kernel extension being available for access by the client kernel extension;
loading, into the kernel of the operating system of the computer and without determining whether its calling dependencies will be loaded, the server kernel extension after the loading of the client kernel extension, the server kernel extension providing the function that provides the non-critical service;
registering, in a generic kernel extension framework, the function provided by the server kernel extension;
receiving, in the generic kernel extension framework from the client kernel extension, a request to access the function provided by the server kernel extension;
calling the function for access by the client kernel extension through the generic kernel extension framework; and
unloading, from the kernel and independent of its calling dependencies, the server kernel extension even while the client kernel extension that is configured to access the function provided by the server kernel extension is still loaded in the kernel.

2. The method of claim 1, wherein the client kernel extension and the server kernel extension have a circular dependency such that the client kernel extension acts as a different server kernel extension to the server kernel extension to provide a function that provides a non-critical service to the server kernel extension.

3. The method of claim 1, wherein the running of the client kernel extension in the kernel of the operating system of the computer continues after the unloading from the kernel the server kernel extension.

4. The method of claim 1, wherein the client kernel extension is configured to access a different function that provides a different non-critical service, wherein the running of the client kernel extension in the kernel of the operating system of the computer occurs prior to the different function that provides the different non-critical service is loaded into the kernel.

5. The method of claim 4, wherein the different function is not loaded prior to completion of the running of the client kernel extension in the kernel of the operating system of the computer.

6. The method of claim 1, further comprising:
granting access to the function to the client kernel extension, in response to receiving the request to access the function from the client kernel extension; and
releasing the access to the function by the client kernel extension.

7. The method of claim 6, further comprising:
responsive to releasing the access to the function, determining whether any other client kernel extensions are still granted access to the function; and
responsive to determining that no other client kernel extensions are still granted access to the function, unregistering the function.

8. A system for administration of kernel extensions, the system comprising:
a processor; and
a module operable in an operating system and executable on the processor, the module configured to:
load, into a kernel of the operating system of a computer and without determining whether its calling dependencies will be loaded, a client kernel extension that is configured to access a function that provides a non-critical service, the function provided by a server kernel extension, wherein the function provided by a server kernel extension is not loaded into the kernel at the time of loading of the client kernel extension, and wherein the client kernel extension is loaded and executed even if the function provided by the server kernel extension is never to be loaded;
run the client kernel extension in the kernel of the operating system of the computer prior to the function that provides a non-critical service provided by the server kernel extension being available for access by the client kernel extension;
load, into the kernel of the operating system of the computer and without determining whether its calling dependencies will be loaded, the server kernel extension after the loading of the client kernel extension, the server kernel extension providing the function that provides the non-critical service;
register, in a generic kernel extension framework, the function provided by the server kernel extension;
receive, in the generic kernel extension framework from the client kernel extension, a request to access the function provided by the server kernel extension;
call the function for access by the client kernel extension through the generic kernel extension framework; and
unload, from the kernel and independent of its calling dependencies, the server kernel extension even while the client kernel extension that is configured to access the function provided by the server kernel extension is still loaded in the kernel.

9. The system of claim 8, wherein the client kernel extension and the server kernel extension have a circular dependency such that the client kernel extension acts as a different server kernel extension to the server kernel extension to provide a function that provides a non-critical service to the server kernel extension.

10. The system of claim 8, wherein the client kernel extension is configured to continue to run in the kernel of the operating system of the computer after the unload from the kernel of the server kernel extension.

11. The system of claim 8, wherein the client kernel extension is configured to access a different function that provides a different non-critical service, wherein the run of the client kernel extension in the kernel of the operating system of the computer is configured to occur prior to a load of the different function that provides the different non-critical service into the kernel.

12. The system of claim 11, wherein the different function is not loaded prior to completion of the run of the client kernel extension in the kernel of the operating system.

13. The system of claim 8, wherein the module is configured to:
grant access to the function to the client kernel extension, in response to receiving the request to access the function from the client kernel extension; and
release the access to the function by the client kernel extension;
responsive to the release of the access to the function, determine whether any other client kernel extensions are still granted access to the function; and
responsive to determination that no other client kernel extensions are still granted access to the function, unregister the function.

14. A computer program product for administration of kernel extensions, the computer program product comprising:
a computer readable storage medium having computer usable program code embodied therewith, the computer usable program code comprising a computer usable program code configured to:
load, into a kernel of the operating system of a computer and without determining whether its calling dependencies will be loaded, a client kernel extension that is configured to access a function that provides a non-critical service, the function provided by a server kernel extension, wherein the function provided by a server kernel extension is not loaded into the kernel at the time of loading of the client kernel extension, and wherein the client kernel extension is loaded and executed even if the function provided by the server kernel extension is never to be loaded;
run the client kernel extension in the kernel of the operating system of the computer prior to the function that provides a non-critical service provided by the server kernel extension being available for access by the client kernel extension;
load, into the kernel of the operating system of the computer and without determining whether its calling dependencies will be loaded, the server kernel extension after the loading of the client kernel extension, the server kernel extension providing the function that provides the non-critical service;
register, in a generic kernel extension framework, the function provided by the server kernel extension;
receive, in the generic kernel extension framework from the client kernel extension, a request to access the function provided by the server kernel extension;
call the function for access by the client kernel extension through the generic kernel extension framework; and
unload, from the kernel and independent of its calling dependencies, the server kernel extension even while the client kernel extension that is configured to access the function provided by the server kernel extension is still loaded in the kernel.

15. The computer program product of claim 14, wherein the client kernel extension and the server kernel extension have a circular dependency such that the client kernel extension acts as a different server kernel extension to the server kernel extension to provide a function that provides a non-critical service to the server kernel extension.

16. The computer program product of claim 14, wherein the client kernel extension is configured to continue to run in the kernel of the operating system of the computer after the unload from the kernel of the server kernel extension.

17. The computer program product of claim 14, wherein the client kernel extension is configured to access a different function that provides a different non-critical service, wherein the run of the client kernel extension in the kernel of the operating system of the computer is configured to occur prior to a load of the different function that provides the different non-critical service into the kernel.

18. The computer program product of claim 17, wherein the different function is not loaded prior to completion of the run of the client kernel extension in the kernel of the operating system of the computer.

19. The computer program product of claim 14, wherein the computer usable program code is configured to:
   grant access to the function to the client kernel extension, in response to receiving the request to access the function from the client kernel extension; and
   release the access to the function by the client kernel extension.

20. The computer program product of claim 19, wherein the computer usable program code is configured to:
   responsive to the release of the access to the function, determine whether any other client kernel extensions are still granted access to the function; and
   responsive to determination that no other client kernel extensions are still granted access to the function, unregister the function.

* * * * *